US010049158B1

(12) United States Patent
Goetz (10) Patent No.: US 10,049,158 B1
(45) Date of Patent: Aug. 14, 2018

(54) ANALYZING USER BEHAVIOR RELATIVE TO MEDIA CONTENT

(75) Inventor: Jeromey R. Goetz, Kent, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 13/404,459

(22) Filed: Feb. 24, 2012

(51) Int. Cl.
*G06F 3/048* (2013.01)
*G06F 17/30* (2006.01)

(52) U.S. Cl.
CPC .................. *G06F 17/3082* (2013.01)

(58) Field of Classification Search
CPC .... G06F 3/048; G06F 3/0484; G06F 17/3082; G06F 11/1402; G06F 11/1446; G06F 11/3438; G06F 17/30017; H04N 21/4622; H04N 21/43615; H04N 21/4667; H04N 21/4532; H04N 21/812
USPC ........................................ 725/9, 10; 715/719
See application file for complete search history.

(56) References Cited

U.S. PATENT DOCUMENTS

| | | | |
|---|---|---|---|
| 7,220,910 B2* | 5/2007 | Plastina et al. ................. 84/615 |
| 2003/0093790 A1* | 5/2003 | Logan ............... G06F 17/30265 | 725/38 |
| 2006/0008256 A1* | 1/2006 | Khedouri .......... G06F 17/30038 | 386/234 |
| 2008/0010372 A1* | 1/2008 | Khedouri .......... G06F 17/30094 | 709/224 |
| 2010/0070992 A1* | 3/2010 | Morris ............... H04N 7/17336 | 725/32 |
| 2010/0293566 A1* | 11/2010 | Valdez ........................... 725/14 |
| 2011/0060742 A1* | 3/2011 | Heller et al. .................. 707/741 |
| 2011/0173194 A1* | 7/2011 | Sloo et al. .................... 707/736 |
| 2011/0289534 A1* | 11/2011 | Jordan et al. .................. 725/48 |
| 2012/0089911 A1* | 4/2012 | Hosking et al. ............... 715/716 |

* cited by examiner

*Primary Examiner* — Jennifer To
*Assistant Examiner* — Terri Filosi
(74) *Attorney, Agent, or Firm* — Thomas | Horstemeyer, LLP (57) ABSTRACT

Disclosed are various embodiments for identifying events in media content based on user actions with respect to the rendering of such media content. To this end, media content is rendered in a computing device. User actions are obtained relative to a user interaction with the media content item. Such user actions are sent in the form of user behavior reports to at least one server. Each user behavior report indicates the user action and a timestamp associated with the user action, the timestamp indicating a point in the media content item. An application on the server identifies events in the media content based on the information in the behavior reports.

19 Claims, 5 Drawing Sheets

ANALYZING USER BEHAVIOR RELATIVE TO MEDIA CONTENT

BACKGROUND

A user may view streaming media content via a browser, television, set top box, or other device in a streaming media format that is provided from a producer or provider. Users may view such media content for their own enjoyment, for informational purposes, or for a variety of other reasons.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to tracking and analyzing various forms of user behavior relative to the consumption of media content in order to identify an event in the media content, such as, for example, a start of an actual movie or other event in the media content. In one embodiment, data indicating the user behavior from one or more users viewing the media content may be collected and reported to a server. Analysis of the user behavior data may be employed to determine one or more events that occur at specific points or segments in the media content. Metadata descriptive of the event may be generated and associated with the media content, thereby providing users with place markers of various events in the media content to make navigation easier and for other uses. In the following discussion, a general description of the system and its components is provided, followed by a discussion of the operation of the same.

Figure 1:
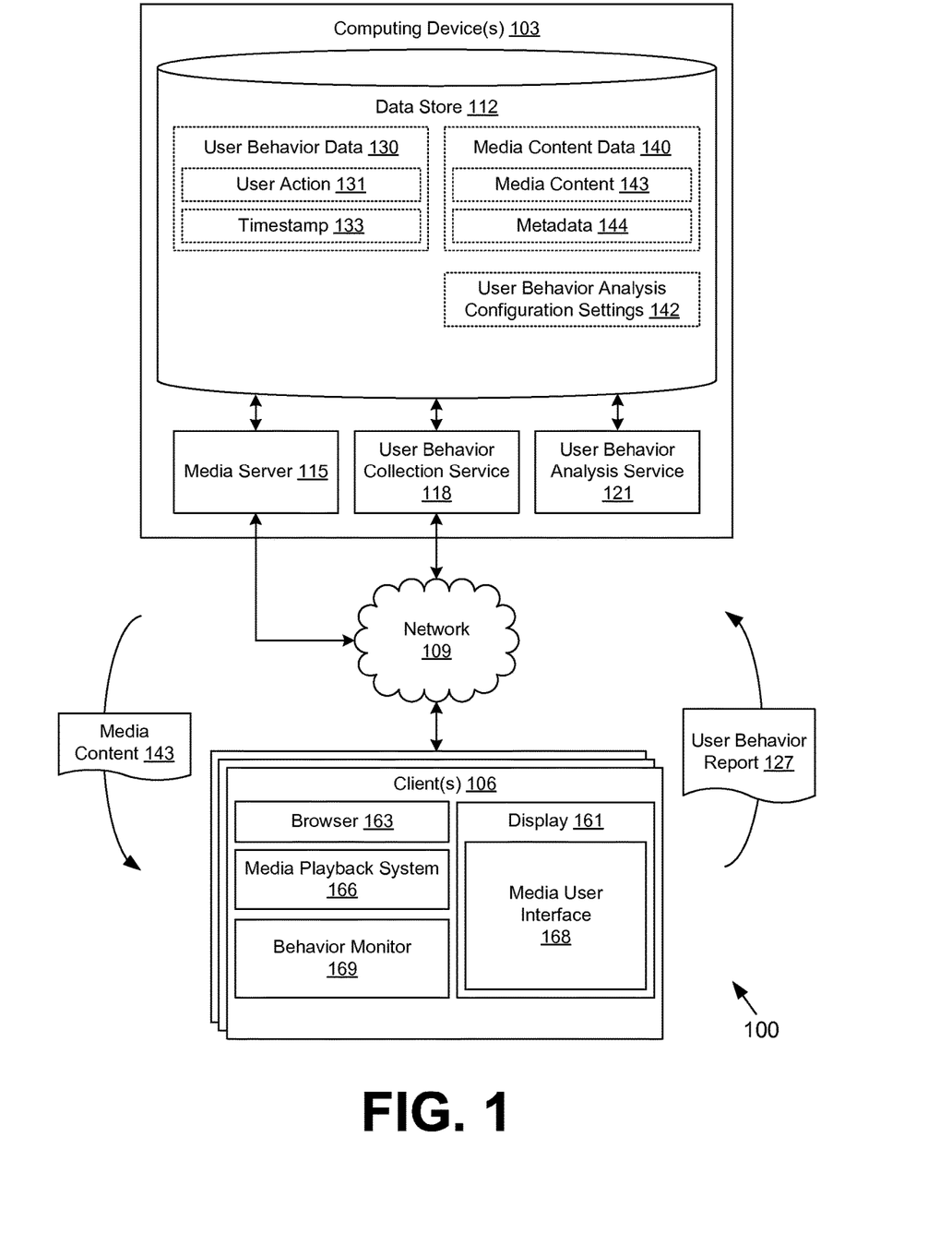
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a media server 115, a user behavior collection service 118, a user behavior analysis service 121, and other applications, services, processes, systems, engines, or functionality not discussed in detail herein. The media server 115 may be configured to deliver media content to a client 106, such as, for instance, audio clips, video clips, programs, sporting events, television programs, and the like. In one embodiment, the media content may be a video or a video that is interlaced with or produced in conjunction with audio sounds or signals. To this end, the media server 115 can communicate with a client 106 to provide streaming video that may have one or more accompanying audio tracks that are configured to be synchronized with any video signals therein.

The user behavior collection service 118 is executed to receive user behavior reports 127 from clients 106 by way of the network 109. The user behavior collection service 118 is configured to store the information included in the user behavior reports 127 in the data store 112 as the user behavior data 130. The user behavior analysis service 121 is executed to process and analyze the user behavior data 130 to identify an event or moment occurring in media content from which relevant metadata may be generated as will be described.

The data stored in the data store 112 includes, for example, user behavior data 130, media content data 140, user behavior analysis configuration settings 142, and potentially other data. The user behavior data 130 includes the information contained in the user behavior reports 127 that have been collected from a plurality of clients 106 and stored in the data store 112. Each instance of user behavior data 130 may include, for example, a user action 131, a timestamp 133 and potentially other data.

The user action 131 may correspond to an action performed by the user relative to the media content being rendered for the user. In one embodiment, the user action 131 may correspond to a user selection of one or more audio/video controls while the user consumes media content, such as, for instance, a fast-forward button, a re-play button, a play button, a stop button, and so on.

The timestamp 133 may comprise a point in the media content at which the user performs a user action 131. In one embodiment, the timestamp 133 may comprise a numerical time, such as, for instance, thirty minutes. In other embodiments, the timestamp 133 may be a frame number or other point of designation in the media content where the user action 131 occurred.

The media content data 140 corresponds to content from the media server 115 or other source that may be displayed or otherwise rendered on a client 106. The media content data 140 may comprise media content 143, metadata 144, and/or other data. The media content 143 comprises content that can be provided and/or streamed to a client 106 via network 109. The media server 115 may access one or more sources for such content. In one embodiment, the media server 115 may be configured to access one or more pre-recorded sources, which may comprise a data storage structure containing pre-recorded media content 143. In another embodiment, the media server 115 may be configured to access one or more live sources for such content. For instance, a live media engine may provide live media content 143 to the media server 115 through network 109, which can in turn provide a media stream to a client 106.

The metadata 144 may comprise one or more tags, keywords, or other data associated with an event in the media content 143. Additionally, the metadata 144 may comprise time boundaries associated with keywords and/or tags. For instance, the metadata 144 may specify that a keyword is relevant from a first frame to the tenth frame of the media content 143 as will be described. The user behavior analysis configuration settings 142 may comprise various parameters that govern the analysis of the user behavior data 130 by the user behavior analysis service 121. The user behavior analysis configuration settings 142 may comprise, for example, weights to apply to the data collected in the user behavior data 130, a threshold number of user actions 131 needed in order to identify an event in the media content 143, and/or potentially other data. Additionally, the user behavior analysis configuration settings 142 may configure parameters that govern adjustment of such threshold numbers based upon, for instance, the number of clients 106 viewing the media content 143 as will be described.

The client 106 is representative of a plurality of client devices that may be coupled to or are otherwise in data communication with the network 109. The client 106 may comprise, for example, a processor-based system such as a computer system. Such a computer system may be embodied in the form of a digital video recorder, such as TiVo™, a cable company DVR, or other like devices on the market. Alternatively, the computer system of the client 106 may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 either includes or is coupled to a display 161. The display 161 comprises, for example, a television or other monitor that comprises, for example, one or more display technologies such as cathode ray tubes (CRTs), liquid crystal displays (LCD) screens, gas plasma-based flat panel displays, LCD projectors, or other types of display devices. The display 161 generates video images as can be appreciated.

The client 106 may be configured to execute various applications such as a browser application 163, a media playback system 166, a behavior monitor 169, and/or other applications. The browser application 163 may be executed in the client 106 to access and render network pages, such as, web pages or portions thereof. The browser application 163 may execute logic such as plug-ins and other executable portions of such network pages as will be described. The media playback system 166 may be configured to, for example, render media content 143 on the display 161 or other output components such as speakers and the like. In one embodiment, the media playback system 166 may comprise a media player that, when executed, generates a media user interface 168 within which the rendered media content 143 is displayed. The media playback system 166 may be embedded, for example, in network content served up to the client 106. For example, the media playback system 166 may be embedded into a network page that is rendered by the browser application 163. Alternatively, the media playback system 166 may comprise stand-alone logic that is executed as part of the client 106 that renders the media content 143 directly on a display 161 such as might be the case with a set top box or other like client 106.

The behavior monitor 169 is configured to track user actions 131 taken by users with respect to the rendering of the media content 143. The behavior monitor 169 generates a log of the user actions 131 that occur and then sends the user actions to the user behavior collection service 118 as one or more user behavior reports 127. The behavior monitor 169 may comprise a stand-alone application executed in the client 106, or the behavior monitor 169 may comprise a plug-in or other encapsulation that is executed by the browser application 163. Alternatively, the functionality of the behavior monitor 169 may be implemented in some other manner.

Next, a general description of the operation of the various components of the networked environment 100 is provided. To begin, a user at a client 106 may request, for example, media content 143 such as video and/or audio from the media server 115. In one embodiment, the media content 143 may be streamed from the media server 115 to the client 106. In response to receiving the request, the media server 115 may be configured to provide the requested media content 143 to the client 106 through network 109. Ultimately, the media playback system 166 renders the media content 143 in the form of a media user interface 168 on the client 106. Also, audio may be rendered on speakers (not shown) associated with the client 106.

In one embodiment, the media playback system 166 may comprise a media player or other system. In one embodiment, the media server 115 may encode the media playback system 166 and send the same along with the media content 143 to render the media content 143 on the client 106. Alternatively, the media playback system 166 may already reside on a client 106, thereby eliminating the need for the media server 115 to send the media playback system 166 to the client 106. In addition, the media server 115 may also encode and send the behavior monitor 169 to the client 106 with the media content 143. Alternatively, the behavior monitor 169 may already reside on a client 106 when the media content 143 is sent to the client 106.

When media content 143 is rendered on the client 106, the behavior monitor 169 tracks user behavior relative to the media content 143. The behavior monitor 169 ultimately reports the user behavior to the user behavior collection service 118 in the user behavior reports 127.

Alternatively, assume that a user employs the client 106 to record media content 143 that would normally be viewed on the display 161, such as, for instance, a television show. However, rather than viewing the media content 143, assume the user has programmed the media playback system 166 to save the media content 143 for later viewing. To this end, the media playback system 166 may be configured to interface with one or more servers to store the media content 143 in, for example, a storage bucket associated with the user who owns or operates the client 106. In this case, the user may send a request for the recorded media content 143, which may be rendered by the media playback system 166 on the display 161 of the client 106.

The media server 115 may be configured to interface with the media playback system 166 such that the behavior monitor 169 may track user behavior relative to the media content 143 being viewed by a client 106. Each user action 131 of the user with respect to the rendered media content 143 is stored in a log file or other location in the client 106. A timestamp 133 is generated and stored for each user action 131 that indicates the location in the media content 143 where the user action 131 occurred. The user actions 131 and their associated timestamps 133 are sent to the user behavior collection service 118 at predefined time intervals during the rendering of the media content 143. Alternatively, such user actions 131 and their associated timestamps 133 may be sent to the user behavior collection service 118 all at once at the end of the rendering of the media content 143 or some other time.

Various forms of user behavior relative to the media content 143 being rendered may include, for example, a user selection of one or more video controls by the user while viewing the media content 143, such as, for example, selecting a fast-forward button, a pause button, and so on. Also, a user may adjust audio volume, may temporarily stop playback, or may take other user actions 131. Such user behavior may be relevant in identifying a point where an event occurs in the media content 143, such as, for instance, a start of a movie, a beginning point or an end point of an introduction theme, the start of credits for a video, and so on.

When user behavior reports 127 are received by the user behavior collection service 118, it stores the user actions 131 and timestamps 133 as user behavior data 130 in the data store 112.

Once sufficient user behavior data 130 has been stored for a respective item of media content 143, the user behavior analysis service 121 may perform an analysis of the user behavior data 130 to identify events in the media content 143. The user behavior analysis service 121 may analyze the user behavior data 130 from a multitude of clients 106 and users to identify such events. To do so, the user behavior analysis service 121 may employ a variety of techniques to analyze the user behavior data 130.

For instance, in one embodiment, the user behavior analysis service 121 may plot user actions 131 and corresponding timestamps 133 in a graph. To this end, the user behavior analysis service 121 may be configured to identify a cluster of points appearing in the graph. The user behavior analysis service 121 may infer that an event in the media content 143 may be occurring at the time of the cluster in media content 143.

Additionally, the user behavior analysis service 121 may identify an event in the media content 143 by determining whether a user action 131 is commonly associated with user interest or disinterest in viewing the media content 143. That is, a user's natural behavior may be to skip credits in a video or a television show. The user behavior data 130 from a multitude of clients 106 may indicate what event is occurring in the media content 143. For instance, where many users selected a fast-forward button near the start of the media content 143, the user behavior analysis service 121 may infer that the event occurring is the start of credits or commercials in the media content 143.

Upon identifying an event occurring in the media content 143, the user behavior analysis service 121 may then generate metadata 144 containing keywords and/or tags relating to the events that are associated with the media content 143. Such metadata 144 may be embedded within the media content 143, added to the beginning or end of the media content 143, or be stored in a separate file that is associated with the media content 143.

In one embodiment, the metadata 144 may include a beginning time boundary and/or an ending time boundary for which a keyword or tag is relevant. For instance, the beginning time boundary may be a frame or unit of time in the media content 143 when users selected a video control. Likewise, the ending time boundary may correspond to when the user selected another video control.

Additionally, the user behavior analysis service 121 may be configured to generate a metadata 144 for the media content 143 so long as one or more parameters defined in the user behavior analysis configuration settings 142 are met. For instance, the user behavior analysis configuration settings 142 may provide that a tag for a point or segment in the media content 143 may be generated only if a threshold number of users have selected a video control at a particular point in time in the media content 143.

As another example, the user behavior analysis configuration settings 142 may provide for a time variation, such as five seconds or other time period, within which actions are to be considered for a given median point in time relative to the media content 143. That is users selecting the fast forward button anywhere between fifty-five seconds and one minute and five seconds in the media content 143 may be included in meeting the threshold value as described above.

Additionally, the user behavior analysis configuration settings 142 may adjust the threshold number of users needed to generate a tag for the media content 143. That is, newly released media content 143 may only require a low threshold number of users performing a user action 131 such as, for example, twenty users or other number. However, as more users view the media content 143, the threshold may increase. To this end, tags and or other keywords for media content 143 may be generated only when a predefined threshold number of users relative to the whole have performed a user action 131 while viewing the media content 143, thereby ensuring precise bookmarking of key moments as opposed to relatively unimportant moments in the media content 143.

Further, in one embodiment, when a user performs a user action 131 while rendering the media content 143, a user may be directed to a network page that facilitates the input of why the user performed the user action 131. The client 106 may then transmit the information to the user behavior analysis service 121. To this end, the user behavior analysis service 121 may use such information in generating metadata 144 associated with the media content 143.

Once generated, the metadata 144 may be sent to a requesting client 106 with media content 143. Such metadata 144 may be embedded in the media content 143 or otherwise associated with the media content 143.

Figure 2:
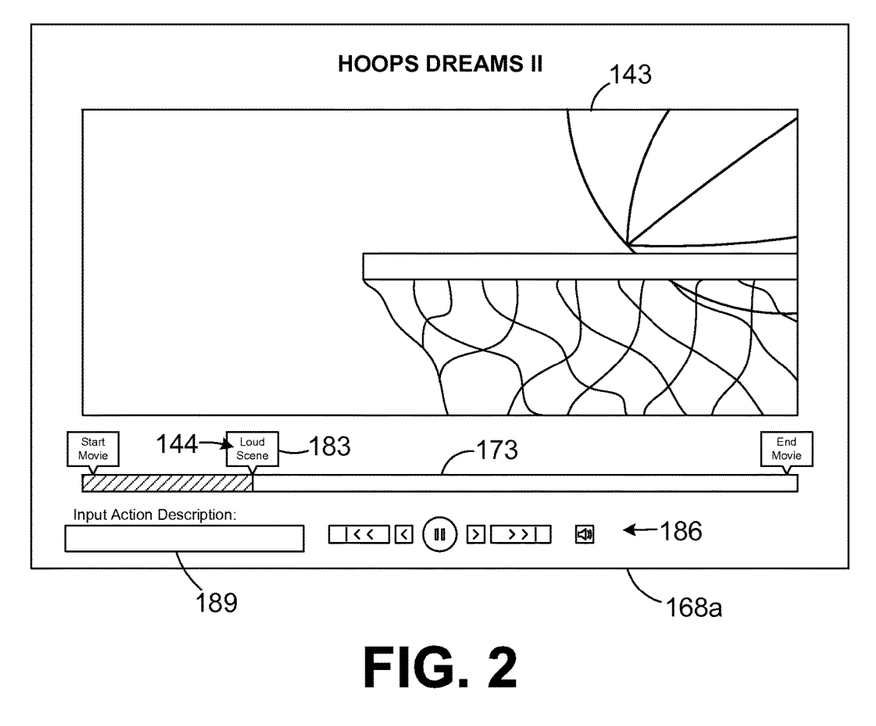
FIG. 2 is a drawing of one example of a user interface that is rendered on a client in the networked environment of FIG. 1 according to an embodiment of the present disclosure.

With reference to FIG. 2, shown is an example of a media user interface 168 (FIG. 1), denoted herein as media user interface 168a, according to an embodiment of the present disclosure. The media user interface 168a may be rendered on a display 161 (FIG. 1) upon the execution of a media player or other similar system in the client 106 (FIG. 1). The media user interface 168a includes a depiction of media content 143 that is rendered on the display 161. The progress of the playback of the media content 143 is indicated by a progress bar 173. At various locations along the progress bar 173 are event markers 183 that indicate a location of an event in the media content 143. To this end, a location of the event derived from the timestamps 133 may be employed to position the event marker 183 at a relevant location along the progress bar 173 to indicate the location of the event relative to the entire media content 143. Each event marker 183 includes the relevant metadata 144 associated with the respective media content 143. Further, the media user interface 168a includes controls 186 that may be manipulated by a user to perform various actions with respect to the rendering of the media content 143.

In addition, the media user interface 168a may include an input mechanism such as an input field 189 to facilitate a user specification of metadata 144 that is descriptive of an action taken by a user with respect to rendered media content 143.

Figure 3:
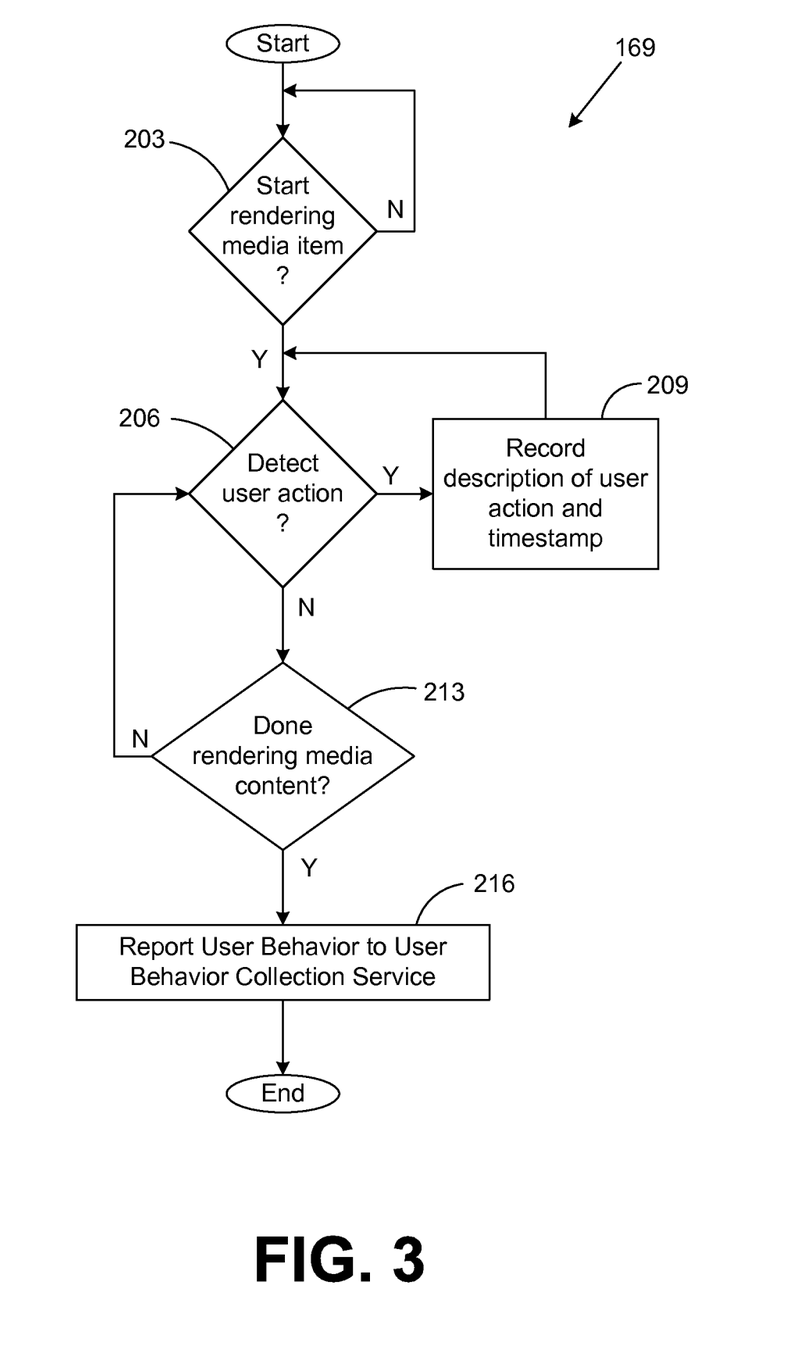
FIG. 3 is a flowchart illustrating one example of functionality implemented as portions of a behavior monitor executed in a client in the networked environment of FIG. 1 according to various embodiments of the present disclosure.

Referring next to FIG. 3, shown is a flowchart that provides one example of the operation of a portion of the behavior monitor 169 (FIG. 1) or other client-side application as described herein. It is understood that the flowchart of FIG. 3 provides merely an example of the many different types of functional arrangements that may be employed to implement the operation of the portion of the behavior monitor 169 as described herein. As an alternative, the flowchart of FIG. 3 may be viewed as depicting an example of steps of a method implemented in the client 106 (FIG. 1) according to one or more embodiments.

It is assumed that the media playback system 166 (FIG. 1) renders various media content 143 (FIG. 1) from time to time. The behavior monitor 169 is executed in the client 106 in order to identify user actions 131 (FIG. 1) with respect to the rendering of media content 143 and to send such user actions 131 to the user behavior collection service 118 (FIG. 1). To this end, in one embodiment, the behavior monitor 169 may be initially executed in the client 106 and waits until the rendering of media content 143 begins. Alternatively, the behavior monitor 169 may be executed at the time a media content 143 is rendered. As an additional alternative, the behavior monitor 169 may be transmitted initially to the client 106 along with a media content 143 served up or streamed from the computing device 103 (FIG. 1) and executed concurrently with the rendering of the media content 143.

Beginning at box 203, the behavior monitor 169 determines whether media content 143 has begun rendering on the client 106. Alternatively, the behavior monitor 169 may be executed at the time the rendering of media content 143 has begun as described above. In such case, the behavior monitor 169 would not detect whether media content 143 is being rendered. Initially, the behavior monitor 169 may determine an identifier associated with the media content 143 such as a title of the media content 143 so that such information can be included in the respective user behavior reports 127 (FIG. 1) sent to the computing device 103.

Next, in box 206, the behavior monitor 169 monitors the various input mechanisms that may be manipulated by users during the rendering of the media content 143 to detect a user action 131 taken by such users. Such user action 131 may be, for example, a user selecting fast-forward, skip, or other video control while viewing the media content 143. Assuming that the behavior monitor detects that a user action 131 has been performed at a given time during the rendering of the media content 143, then the behavior monitor proceeds to box 209.

In box 209, a description of the user action 131 and a timestamp 133 (FIG. 1) indicating the relative location of the user action 131 in the media content 143 are recorded in memory to be sent to the user behavior collection service 118 at a later time or shortly after the user action 131 is recorded as will be described. Thereafter, the behavior monitor 169 reverts back to box 206 to further detect other user actions 131. Assuming that no user action 131 is detected in box 206, the behavior monitor 169 proceeds to box 213.

In box 213, it is determined whether the rendering of the media content 143 has ended. If not, then the behavior monitor 169 reverts back to box 206. Thus, the behavior monitor 169 constantly monitors the operation of the client 106 to detect and record user actions 131 with respect to the rendering of media content 143 until the rendering of the media content 143 ends. Assuming that the rendering of the media content 143 has ended, then the behavior monitor 169 proceeds to box 216 in which a user behavior report 127 is generated that includes an identification of the media content 143 and a listing of each of the user actions 131 detected with their corresponding timestamps 133. The behavior monitor 169 then sends the user behavior report 127 to the user behavior collection service 118. Thereafter, the behavior monitor 169 either ends or reverts back to box 203 to detect the rendering of further media content 143.

In addition, it may be the case that a user behavior report 127 may be sent for each user action 131 or a group of user actions 131 of a predefined size during the rendering of the media content 143.

Figure 4:
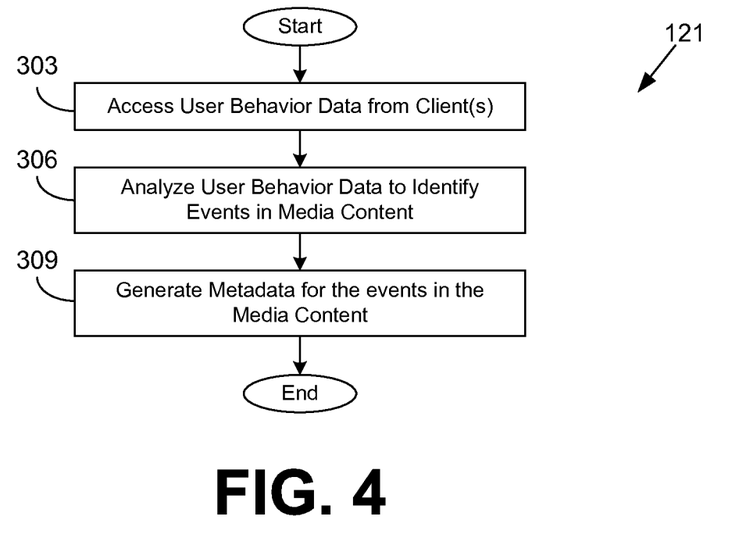
FIG. 4 is a flowchart illustrating one example of functionality implemented as portions of a user behavior analysis service executed in a computing device in the networked environment of FIG. 1 according to various embodiments of the present disclosure.

Turning now to FIG. 4, shown is a flowchart that provides one example of the operation of portions of the user behavior analysis service 121 according to various embodiments. It is understood that the flowchart of FIG. 4 provides merely an example of the many different types of functional arrangements that may be employed to implement the operation of the portions of the user behavior analysis service 121 as described herein. As an alternative, the flowchart of FIG. 4 may be viewed as depicting an example of steps of a method implemented in the computing device 103 (FIG. 1) according to one or more embodiments.

Beginning with box 303, the user behavior analysis service 121 accesses user behavior data 130 (FIG. 1) stored in the data store 112 (FIG. 1) that originated from a plurality of clients 106 (FIG. 1) for an instance of media content 143 (FIG. 1).

Next, in box 306, the user behavior analysis service 121 determines whether the user behavior data 130 identifies a key point or moment in media content 143. As an example, the user behavior data 130 might show many users selecting a fast forward video control at a particular point in the media content 143, thereby suggesting the start of a particular segment in the media content 143 such as, for instance, the beginning of credits in the media content 143. In some cases, the user behavior analysis service 121 may refer to the user behavior analysis configuration settings 142 (FIG. 1) associated with the user behavior data 130 and/or other data. That is, the user behavior analysis configuration settings 142 may specify a threshold number of user actions 131 that may occur in order to identify a particular event or key moment in the media content 143. Then, in box 309, the user behavior analysis service 121 generates metadata 144 (FIG. 1) based upon the user behavior data 130 and stores such metadata 144 in association with the respective media content 143 as mentioned above. Thereafter, the user behavior analysis service 121 ends as shown.

Figure 5:
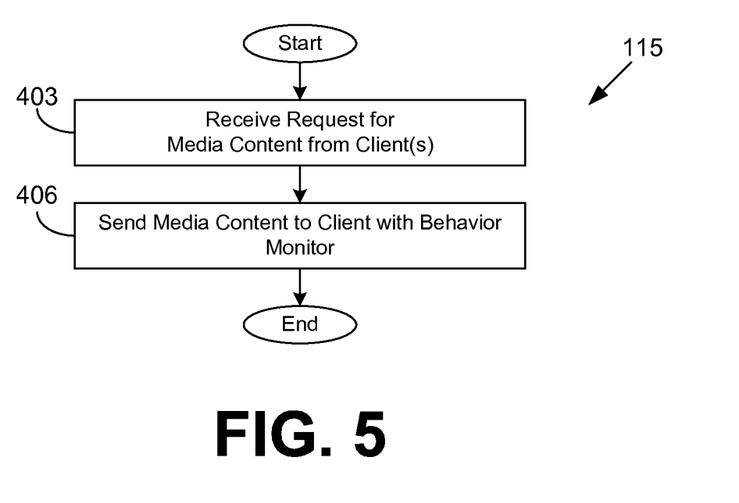
FIG. 5 is a flowchart illustrating one example of functionality implemented as portions of a media server executed in a computing device in the networked environment of FIG. 1 according to various embodiments of the present disclosure.

Moving on to FIG. 5, shown is a flowchart that provides one example of the operation of a portion of the media server 115 according to various embodiments. It is understood that the flowchart of FIG. 5 provides merely an example of the many different types of functional arrangements that may be employed to implement the operation of the portion of the media server 115 as described herein. As an alternative, the flowchart of FIG. 5 may be viewed as depicting an example of steps of a method implemented in the computing device 103 (FIG. 1) according to one or more embodiments.

Beginning with box 403, the media server 115 obtains a request for a media content 143 (FIG. 1) from a client 106 (FIG. 1) by way of the network 109 (FIG. 1). In box 406, the media server 115 sends media content 143 to the client 106. Thereafter, the portion of the media server 115 ends. The media content 143 may include the behavior monitor 169 (FIG. 1). In some cases, the behavior monitor 169 may correspond to a plug-in or other application which is cached or permanently installed upon the client 106. Where the behavior monitor 169 resides on the client 106, then it is not necessary to include the behavior monitor 169 in the response to the request for media content 143. In addition, the metadata 144 (FIG. 1) may be sent with the media content 143 and is rendered in the event markers 183 (FIG. 2) or may be rendered in some other manner.

Figure 6:
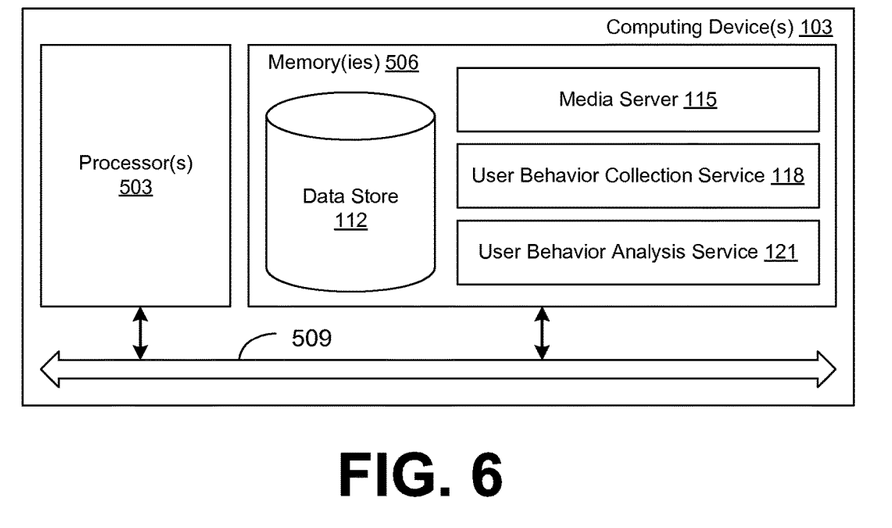
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the media server 115, the user behavior collection service 118, the user behavior analysis service 121, and potentially other applications. Also stored in the memory 506 may be a data store 112 and other data. In addition, an operating system may be stored in the memory 506 and executable by the processor 503.

Figure 7:
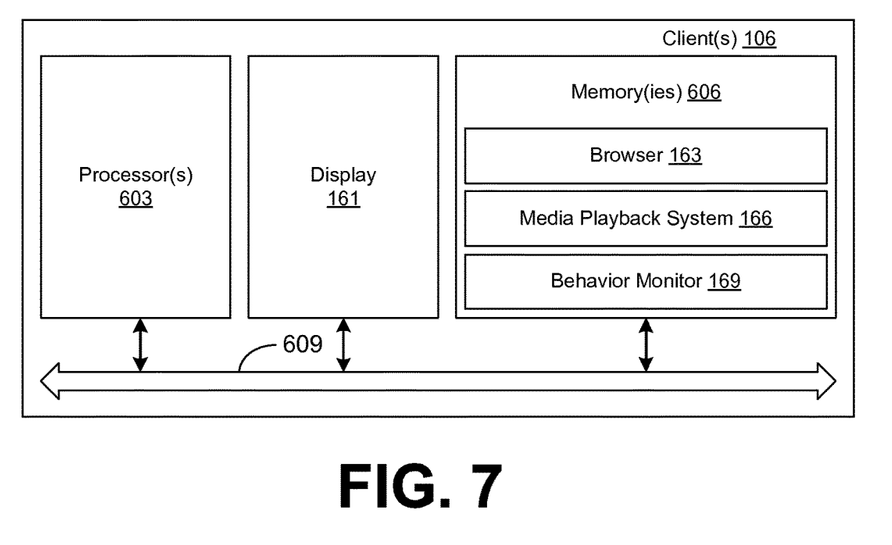
FIG. 7 is a schematic block diagram that provides one example illustration of a client device employed in the networked environment of FIG. 1 according to various embodiments of the present disclosure.

Referring to FIG. 7, shown is a schematic block diagram of an example of a client 106 according to an embodiment of the present disclosure. The client 106 includes at least one processor circuit, for example, having a processor 603 and a memory 606, both of which are coupled to a local interface 609. The client 106 also includes the display 161. To this end, the client device 106 may comprise, for example, a computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the browser application 163, the media playback system 166, the behavior monitor 169, and potentially other applications. Also other components may be stored in the memory 606 executed or accessed by the processor. In addition, an operating system may be stored in the memory 606 and executable by the processor 603.

With reference to both FIGS. 6 and 7, it is understood that there may be other applications that are stored in the respective memories 506/606 and are executable by the corresponding processors 503/603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi Flash®, or other programming languages.

A number of software components are stored in each of the memories 506/606 and are executable by the processors 503/603. In this respect, the term "executable" means a program file that is in a form that can ultimately be run by the processors 503/603. Examples of executable programs may be, for example, a compiled program that can be translated into machine code in a format that can be loaded into a random access portion of the memories 506/606 and run by the respective processors 503/603, source code that may be expressed in proper format such as object code that is capable of being loaded into a random access portion of the memories 506/606 and executed by the respective processors 503/603, or source code that may be interpreted by another executable program to generate instructions in a random access portion of the memories 506/606 to be executed by the respective processors 503/603, etc. An executable program may be stored in any portion or component of the respective memories 506/606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 506/606 is defined herein as including both volatile and nonvolatile memory and data storage components. Volatile components are those that do not retain data values upon loss of power. Nonvolatile components are those that retain data upon a loss of power. Thus, each memory 506/606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 503/603 may represent multiple processors and each memory 506/606 may represent multiple memories that operate in parallel processing circuits, respectively. In such a case, each of the local interfaces 509/609 may be an appropriate network that facilitates communication between any two of the multiple processors 503/603, between any processor 503/603 and any of the memories 506/606, or between any two of the memories 506/606, etc. The local interfaces 509/609 may comprise additional systems designed to coordinate this communication, including, for example, performing load balancing. The processors 503/603 may be of electrical or of some other available construction.

Although the media server 115, the user behavior collection service 118, the user behavior analysis service 121, the behavior monitor 169 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the behavior monitor 169, the user behavior analysis service 121, and the media server 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media server 115, the user behavior collection service 118, the user behavior analysis service 121, the behavior monitor 169, and any other portion that comprises software or code can be embodied in any non-transitory computer-readable medium for use by or in connection with an instruction execution system such as, for example, a processor 503/603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
encoding, by at least one computing device, a behavior monitor, wherein the behavior monitor is an application configured to collect user behavior data indicating at least one user action relative to a media content item and to report the user behavior data to the at least one computing device, wherein the at least one user action comprises at least one of: pausing the media content item, playing the media content item, rewinding the media content item, or adjusting a volume of the media content item;
sending, by the at least one computing device, the encoded behavior monitor and the media content item to a plurality of clients;
obtaining, by the at least one computing device, from two or more of the plurality of clients, a corresponding number of user behavior reports, wherein individual ones of the corresponding number of user behavior reports indicate an action relative to an instance of a rendering of the media content item on the two or more of the plurality of clients;
determining, by the at least one computing device, that a number of clients that have reported the actions relative to the media content item exceeds a predefined threshold number of clients;
responsive to exceeding the predefined threshold number of clients, analyzing, by the at least one computing device, the actions in the corresponding number of user behavior reports to identify an event occurring in the media content item and to identify a point in the media content item that corresponds to the event;
generating, by the at least one computing device, metadata for the media content item based at least in part upon the identified event; and
bookmarking, by the at least one computing device, the identified event in the media content item.

2. The method of claim 1, wherein the metadata comprises at least one of a keyword, a start time boundary of the event occurring in a same media content item, or an end time boundary of the event occurring in the same media content item.

3. The method of claim 1, wherein analysis of the actions identifies the event from the user behavior reports based at least in part on identifying a plurality of user actions that are clustered around a same time period in the same media content item.

4. The method of claim 1, wherein analysis of the actions identifies an event from the user behavior reports based at least in part on identifying a plurality of user actions that are associated with user interest in a segment of the same media content item.

5. A system, comprising:
at least one computing device comprising a processor and a memory; and
at least one application stored in the memory of the at least one computing device and executable by the processor of the at least one computing device, wherein the at least one application is configured to cause the at least one computing device to at least:
encode a behavior monitor to generate an encoded behavior monitor, wherein the encoded behavior monitor is configured to collect user behavior data associated with a user account;
send the encoded behavior monitor and a same media content item to individual ones of a plurality of client devices;
store, in a data store, user behavior data received from the encoded behavior monitor on at least two of the plurality of client devices, the user behavior data indicating an action of a corresponding user account relative to a rendering of the same media content item on the respective client devices;
determine that a number of client devices that have reported the actions relative to the same media content item exceeds a predefined threshold number of client devices;
responsive to exceeding the predefined threshold number of client devices, identify an event in the same media content item based at least in part on the actions in the user behavior data; and
bookmark the event in the same media content item.

6. The system of claim 5, wherein the same media content item comprises a video.

7. The system of claim 5, wherein the at least one application further comprises causing the at least one computing device to:
encode a media playback system to generate an encoded media playback system; and
send the encoded media playback system to the client devices.

8. The system of claim 7, wherein the encoded media playback system comprises a plurality of video controls and individual ones of the video controls control a viewing of the same media content item.

9. The system of claim 8, wherein the action comprises selecting at least one of the plurality of video controls.

10. The system of claim 5, wherein the user behavior data further comprises a timestamp associated with the action, the timestamp indicating a point in the same media content item.

11. The system of claim 5, wherein a level of interest in the same media content item is determined based at least in part on a corresponding action type associated with the action.

12. The system of claim 5, wherein the event comprises a point in the same media content item.

13. The system of claim 5, wherein the at least one application is further configured to cause the at least one computing device to at least generate metadata associated with the event in the same media content item.

14. The system of claim 13, wherein the metadata comprises a keyword, the keyword being used to describe the event in the same media content item.

15. The system of claim 13, wherein the metadata comprises a beginning time boundary and an ending time boundary, wherein the beginning time boundary comprises a starting time associated with the event, and wherein the ending time boundary comprises an ending time associated with the event.

16. A method implemented in a computing device, the method comprising:
encode a behavior monitor to generate an encoded behavior monitor, wherein the encoded behavior monitor is configured to collect user behavior reports from client computing devices;
send the encoded behavior monitor to individual ones of a plurality of client computing devices;
collect, from the individual ones of the plurality of client computing devices, respective ones of a plurality of user behavior reports, wherein individual user behavior reports are captured during consumption of a single media content item at a corresponding one of the client computing devices and indicate a user consumption action and a timestamp;
determine, in the computing device, that a number of client computing devices that have reported the actions relative to the single media content item exceeds a predefined threshold number of client computing devices;
responsive to exceeding the predefined threshold number of client computing devices, analyze, in the computing device, the plurality of user behavior reports to identify an event in the single media content item based at least in part on the user consumption actions and the timestamps in the respective user behavior reports;
generate, in the computing device, metadata for the single media content item corresponding to the identified event; and
bookmark the identified event in the single media content item.

17. The method of claim 16, wherein the user consumption action is the same in at least two of the plurality of user behavior reports.

18. The method of claim 16, wherein the analyzing identifies the event from the plurality of user behavior reports based at least in part on identifying user actions, from at least two of the client computing devices, that are clustered around a same time period in the same media content item.

19. The method of claim 16, wherein the analyzing identifies the event from the plurality of user behavior reports based at least in part on identifying user actions, from at least two of the client computing devices, indicating user interest in a same segment of the same media content item.

* * * * *